United States Patent [19]

Quinn

[11] 4,413,515
[45] Nov. 8, 1983

[54] BARBECUE FUEL LEVEL GAUGE

[75] Inventor: Leonard L. Quinn, Barrie, Canada

[73] Assignee: Dart Industries Inc., Northbrook, Ill.

[21] Appl. No.: 293,037

[22] Filed: Aug. 14, 1981

[51] Int. Cl.³ .......................................... G01F 23/20
[52] U.S. Cl. ................................. 73/296; 126/41 R; 177/225
[58] Field of Search ...................... 73/296; 126/41 R; 177/45, 46, 47, 225

[56] References Cited

U.S. PATENT DOCUMENTS 4,245,505  1/1981  Baynes ................................. 73/296

FOREIGN PATENT DOCUMENTS 653440  11/1937  Fed. Rep. of Germany ........ 73/296
2210827  5/1973  Fed. Rep. of Germany ........ 73/296
491950   3/1954  Italy ..................................... 73/296
2008779  6/1979  United Kingdom ................. 73/296

Primary Examiner—E. R. Kazenske
Assistant Examiner—Brian Tumm

[57] ABSTRACT

A support adjacent to the lower end of the pedestal for a barbecue engages under a bottom edge portion of the barbecue fuel tank such that the tank tends to tilt away from the pedestal by gravity. A gauge member connects to the top of the tank and passes through an opening in the pedestal to protrude out the opposite side. A spring provides a force opposing the tendency of the tank to tilt so that the degree of tilt is determined by the weight of the tank which in turn is determined by the amount of fuel in the tank. Thus, by observing the amount by which the gauge member protrudes through the opening in the pedestal, there is provided an indication of the fuel level in the tank.

4 Claims, 5 Drawing Figures

BARBECUE FUEL LEVEL GAUGE

FIELD OF THE INVENTION

This invention relates generally to barbecues and more particularly to an improved fuel level gauge for gas tanks used in gas type barbecues.

BACKGROUND OF THE INVENTION

Many outdoor barbecues operate from portable gas tanks which may contain liquid butane or other types of liquid natural gas under pressure. It is, of course, desirable that there be provided some type of fuel gauge or indicator which will advise a user of the amount of gas remaining in the tank so that the tank can be changed prior to running out completely.

One means for providing an indication of the amount of gas or liquid level in the gas tank is to simply weigh the tank. When the tank is fully charged, it will be at its heaviest and as the gas is used up, it will become progressively lighter.

In order to provide a continuous indication, it has been proposed to support an edge of the tank with a spring arrangement so that the heavier the tank, the more compressed will become the spring. Through an appropriate linkage mechanism, a rotating dial can be actuated depending upon the amount of compression of the spring. An example of such type of gauge or liquid level indicator for gas tanks is shown in Italian Letters Pat. No. 491,950. While the structure illustrated in this patent will provide an indication of the liquid fuel level in the tank, because of the rotating dial and other interconnecting links, the same is somewhat awkward to use with an outdoor barbecue wherein the gas tank for the barbecue is normally supported on the pedestal frame so as to be moved around with the barbecue itself.

BRIEF DESCRIPTION OF THE PRESENT INVENTION

With the foregoing considerations in mind, the present invention contemplates a liquid fuel level gauge for gas tanks supported on barbecue pedestal frame wherein part of the pedestal frame itself serves as a component of the gauge, all to the end that a compact and simplified arrangement results.

More particularly, in accord with the present invention a support means adjacent to the lower end of the pedestal is provided for engaging under a bottom edge portion of the barbecue fuel tank such that the tank tends to tilt away from the pedestal. A gauge is coupled to the top of the tank adjacent to the pedestal and appropriate spring means are provided opposing the tendency of the tank to tilt away from the pedestal. As a consequence, the degree of tilt is a function of the weight of the tank and therefore the amount of fuel in the tank. This degree of tilt can readily be observed by simply observing the position of the gauge relative to the pedestal.

BRIEF DESCRIPTION OF THE DRAWINGS

A better understanding of this invention will be had by now referring to the accompanying drawings in which.

DETAILED DESCRIPTION OF THE PREFERRED EMBODIMENT

Figure 1:
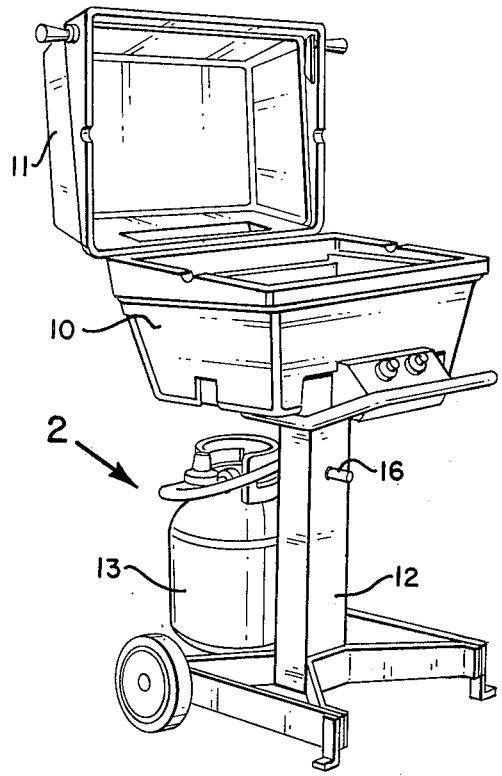
FIG. 1 is a perspective view of an outdoor barbecue with a liquid fuel tank and the fuel level gauge of this invention.

Referring first to FIG. 1, there is shown a barbecue including a base 10 and cover 11. The base 10 houses a fire box and is supported on a vertical pedestal 12 constituting part of a lower frame structure supporting a liquid gas tank 13. The barbecue shown in FIG. 1 may have wheels so that it can be easily moved about, the tank 13 being carried on the pedestal frame structure.

Figure 2:
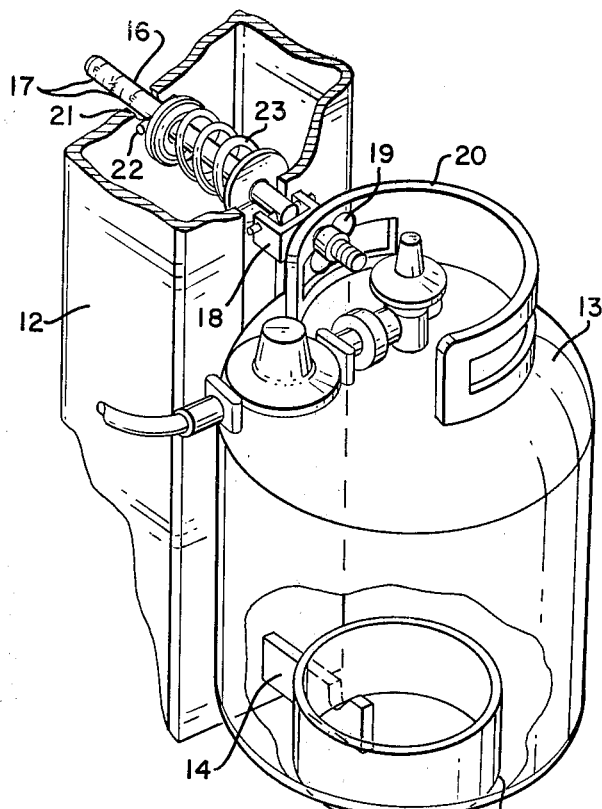
FIG. 2 is a greatly enlarged cut-away perspective view of the tank and gauge mechanism looking in the direction of the arrow 2 of FIG. 1.

Referring now to the enlarged perspective view of FIG. 2, it will be noted that an off-center lower tank support 14 extending from the pedestal frame passes under a lower edge 15 of the tank adjacent to the main pedestal 12. Because of the off-center support on the lower tank edge 15, there is a tendency for the tank to tilt by gravity away from the pedestal 12 as viewed in FIG. 2.

Advantage is taken of this tendency to tilt to provide a very simple gauge to indicate the level of fuel in the tank. This gauge comprises a gauge member 16 shown in the top portion of FIG. 2 having a scale 17 thereon. One end of the gauge member 16 is pivoted as by pivot means 18 in turn adjustably attached as by wing nut 19 to a top frame portion 20 of the tank 13.

In the particular embodiment shown in FIG. 2, the gauge member 16 passes through the pedestal 12 to exit out an opening 21 such that the scale portion 17 is exposed beyond the opening.

The assembly is completed by the provision of a cross pin 22 and cooperating compression spring 23 positioned between the cross pin 22 and the inside rear wall of the pedestal 12. This spring exerts a force opposing the tilting of the tank 13 relative to the pedestal so that the degree of tilting is a function of the weight of the tank and therefore the amount of fuel in the tank.

From the foregoing, it will be evident that the greater the tilt, the less will the gauge member 16 be exposed through the opening 21 of the pedestal so that an indication of the amount of fuel will be indicated by observing the amount of the scale 17 exposed.

Figure 3:
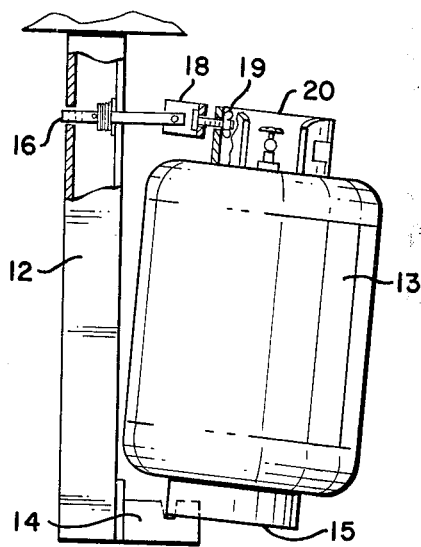
FIG. 3 is a fragmentary side elevational view partly in cross section showing the position of the fuel tank relative to the pedestal when the tank is filled with fuel.
Figure 4:
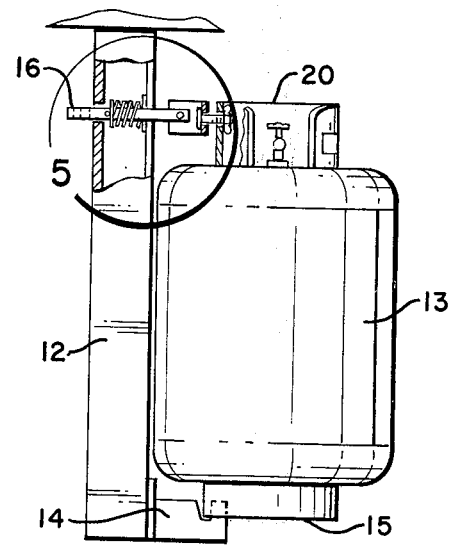
FIG. 4 is a view similar to FIG. 3 but showing the position of the tank relative to the pedestal when the tank is empty of fuel; and, FIG. 5 is a greatly enlarged cross-section of a portion of the gauge enclosed within the circular arrow 5 of FIG. 4.

The foregoing will better be understood by referring to FIGS. 3 and 4 wherein FIG. 3 illustrates the tank 13 at its maximum tilt from the pedestal 12, assumed when the spring is fully compressed so that the gauge member 16 is essentially retracted in the pedestal the maximum amount.

FIG. 4 illustrates the results as the fuel is being used up to lighten the weight of the tank so that the spring described in FIG. 2 will urge the gauge member 16 out of the pedestal opening to expose a maximum amount.

Figure 5:
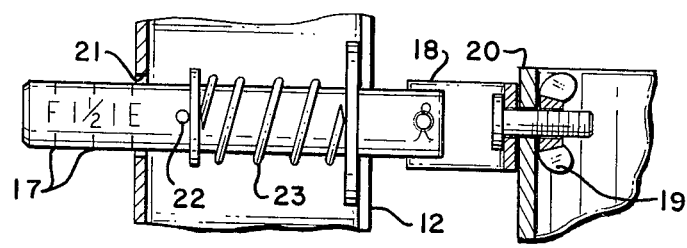

Referring to the enlarged detailed view of FIG. 5, it will be noted that the scale 17 includes the nomenclature F/E. Further, the manner in which the pivot means 18 and the wing nut 19 cooperate to enable adjustment of the position of the pivot means from the top frame 20 for the tank will be clear. Thus, for a given condition of the tank; for example, when the tank is empty, the amount of protrusion of the gauge scale from the opening 21 of the pedestal can be adjusted by the wing nut 19 so that the nomenclature E will just barely be visible, indicating that under these conditions the tank is empty. The position of the cross pin 22 and strength of the spring 23 then determine how much of the gauge 17 will be exposed when the tank is completely full of fuel. When so filled to a maximum level, the portion of the gauge protruding from the opening 21 is marked with the F sign, indicating full. The distance that the gauge extends from the opening 21 is substantially proportional to the liquid level, since increased pressure exerted by the spring corresponds to increased biasing force resulting from the tilt of the tank, the two effects operating in somewhat the same manner.

From all of the foregoing, it will thus be evident that the present invention has provided a very simple and reliable gauge to indicate the liquid levels in barbecue gas tanks wherein part of the barbecue structure itself is used as part of the gauge, all to the end that a minimum number of parts results. Moreover, the entire barbecue can be portably moved on its wheels without affecting the gauge structure since the tank is still carried on the barbecue.

What is claimed is:

1. A fuel level gauge for a barbecue fuel tank including, in combination with a pedestal of a barbecue:
   (a) support means adjacent to a lower end of said pedestal for engaging under a bottom edge portion of the barbecue fuel tank such that the tank tends to tilt away from the pedestal;
   (b) a gauge comprising an elongated member located transversely relative to said pedestal, said elongated member having an end which engages a top portion of said fuel tank, said elongated member being slidably affixed to said pedestal adjacent to the top portion of said fuel tank to permit movement of said elongated member along a direction of its length transversely relative to said pedestal; and,
   (c) spring means opposing the tendency of said tank to tilt away from said pedestal so that the degree of tilt is a function of the weight of the tank and therefore the amount of fuel in the tank, the transverse position of said gauge relative to said pedestal thereby serving as a measure of the fuel level in said tank.

2. The fuel level gauge of claim 1 wherein said spring means is adjacent to said elongated member.

3. A gauge for indicating the level of fuel in a gas tank adjacent to a main pedestal frame of a barbecue, including:
   (a) a main pedestal having a transverse opening adjacent to a top portion of said gas tank;
   (b) an off-center lower tank support passing under a lower edge of said tank adjacent to said pedestal so that said tank has a tendency to tilt by gravity away from said pedestal;
   (c) a gauge member having a scale thereon and having a first end and a second end, said first end passing through said transverse opening in said pedestal;
   (d) a pivot means connecting said second end of said gauge member to the top portion of said tank;
   (e) a spring engaging said gauge member to urge the gauge member through said opening in said pedestal to thereby apply a biasing force on the top portion of said tank by way of said gauge member, the length of the gauge member exposed at its exit end from said opening indicating the fuel level in said tank.

4. A gauge according to claim 3, in which said pivot means includes means for adjusting its distance friom the top portion of said tank so that adjustment in the amount of said gauge member exposed for a given level of fuel in said tank can be made.

* * * * *